(12) United States Patent
DeBoer, III (10) Patent No.: US 9,840,156 B2
(45) Date of Patent: Dec. 12, 2017

(54) AUTOMATICALLY SELECTING CHARGING ROUTINE FOR AN ELECTRIC VEHICLE BY BALANCING UTILITY AND USER CONSIDERATIONS (71) Applicant: SIEMENS INDUSTRY, INC., Alpharetta, GA (US)

(72) Inventor: John R. DeBoer, III, Denver, CO (US)

(73) Assignee: Siemens Industry, Inc., Alpharetta, GA (US)

( * ) Notice: Subject to any disclaimer, the term of this patent is extended or adjusted under 35 U.S.C. 154(b) by 235 days.

(21) Appl. No.: 14/826,480

(22) Filed: Aug. 14, 2015

(65) Prior Publication Data
US 2017/0043674 A1 Feb. 16, 2017

(51) Int. Cl.
H02J 7/14 (2006.01)
H02J 7/00 (2006.01)
B60L 11/18 (2006.01)

(52) U.S. Cl.
CPC ......... *B60L 11/1844* (2013.01); *B60L 11/184* (2013.01); *B60L 11/1825* (2013.01); *B60L 11/1846* (2013.01); *B60L 11/1848* (2013.01); *Y02E 60/721* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/168* (2013.01); *Y02T 90/169* (2013.01); *Y04S 10/126* (2013.01); *Y04S 30/12* (2013.01); *Y04S 30/14* (2013.01)

(58) Field of Classification Search
CPC .................................................. B60L 11/1848

USPC .......................................................... 320/109
See application file for complete search history.

(56) References Cited

U.S. PATENT DOCUMENTS

| | | | |
|---|---|---|---|
| 8,497,660 B2 | 7/2013 | Soong et al. | |
| 8,725,551 B2 | 5/2014 | Ambrosio et al. | |
| 2010/0013436 A1 | 1/2010 | Lowenthal et al. | |
| 2013/0020992 A1 | 1/2013 | Wu et al. | |
| 2013/0179061 A1* | 7/2013 | Gadh ................... | B60L 11/1842 701/123 |
| 2014/0077762 A1 | 3/2014 | Spanos | |
| 2016/0001656 A1 | 1/2016 | Korenaga et al. | |

FOREIGN PATENT DOCUMENTS

| | | |
|---|---|---|
| EP | 2505421 A2 | 10/2012 |
| EP | 2819263 A1 | 12/2014 |
| WO | 2013057587 A2 | 4/2013 |
| WO | 2014132946 A1 | 9/2014 |
| WO | 2014162648 A1 | 10/2014 |

* cited by examiner

Primary Examiner — Edward Tso
Assistant Examiner — Ahmed Omar (57) ABSTRACT

An electric vehicle supply equipment (EVSE) charging system includes an EVSE charging station that is configured to be coupled to an electric vehicle (EV). The charging system further includes an EVSE cloud server coupled to the EVSE charging station optionally via a charge management network. The EVSE cloud server may automatically determine a charging routine for the EV based on historic rate and charge data of the EV and enable a user to interactively modify the charging routine in real-time. The charging routine may provide one or more charging options to the user based on a desired trade-off between different charging cost structures and the required time to charge the EV.

17 Claims, 7 Drawing Sheets

FIG 8A  Charge Now  $3.10

FIG 8B  Get a Little, Save a Little  $2.25

FIG 8C  Charge Later  $1.75

FIG 8D  Save Me Money  $0.80

AUTOMATICALLY SELECTING CHARGING ROUTINE FOR AN ELECTRIC VEHICLE BY BALANCING UTILITY AND USER CONSIDERATIONS

BACKGROUND

1. Field

Aspects of the present invention generally relate to electric vehicles and more specifically relates to smart electrical charging stations or systems for charging electric vehicles.

2. Description of the Related Art

With the advent of high fuel prices, the automotive industry has reacted with a selection of Electric Vehicles (EVs). Such EVs are propelled by an electric motor (or motors) that are powered by rechargeable power sources (e.g., battery packs). EVs include both full electric and hybrid electric vehicles. Electric motors have several advantages over internal combustion engines. For example, electric motors may convert about 75% of the chemical energy from the batteries to power the wheels, whereas internal combustion engines (ICES) may only convert only about 20% of the energy stored in gasoline. EVs emit no tailpipe pollutants when operating in battery mode. Electric motors provide quiet, smooth operation, strong acceleration and require relatively low maintenance. However, most EVs can only go about 100-200 miles before requiring recharging. Fully recharging an EV's battery pack may take 3 to 8 hours. Even a quick charge to about 80% capacity can take about 30 minutes. Furthermore, as battery pack size increases, so does the corresponding charging time. EV charging may take place at the owner's residence using an electric vehicle recharging station, referred to herein as an electric vehicle supply equipment (EVSE). Such EVSEs are typically installed at the residence (e.g., in a garage), and are electrically coupled to the electrical load center for the residence.

Electric vehicle charging is a high power, high energy load that can be shaped or shifted for economic, grid, or societal benefit. The shaping of an electric vehicle's charging load is based on some basic operating conditions surrounding of en electric vehicle and its charging equipment. The most popular EVs on the road today have a wide array of battery sizes ranging from 4 to 85 kWhrs. Battery size has a significant impact on the estimation of the cumulative kWhr demand for EVs; the bigger the battery, the further EV drivers can commute in all electric mode and therefore the larger the amount of energy that needs to be refilled at night. The second factor is the EV's built-in ability to receive electricity which is measured by the size of its inverter. Common inverter sizes range from 3 to 6.6 kW with some select vehicles capable of 10-20 kW. Commonly, EVs with larger battery packs require larger inverters to keep the recharge time to a minimum, causing EVs with larger inverter capability to potentially represent a much larger, faster charging load than EVs with smaller inverter capabilities. The third factor is the maximum charging rate of the charging equipment (EVSE) for the vehicle, varying again widely between what are commonly referred to as Level I and Level II chargers. Most vehicles come equipped with a 120 V AC Level I charger which ranges from 1.2-2.6 kW of charging rate. The majority of EV owners purchase a Level 2 charger in order to maximize the investment in an EV by maximizing the amount of time they are able to drive in full electric mode. Most Level II chargers range from 3.3 to 7.2 kW, with a few models matched to the vehicles that can receive 10-20 kW. For energy demand planning, the lowest size dictates the charging rate. For example, an EV with an inverter capability of 6.6 KW which is being charged by a 3.3 kW charging station will only be capable of drawing a peak charge of 3.3 kW. Given these basic figures, it is easy to illustrate that at a full charging rate of 6.6 kW it is highly feasible to full charge a 24 kW EV between the hours of 1 AM-5 AM if charging at a full rate of 6.6 kW or to full charge an electric vehicle between 9 PM-5 AM at a rate of 3 kW/hour.

In prior technologies, the electric vehicle charging process is either 1) lacking intelligence, 2) possesses intelligence but only to run automated schedules, or 3) has intelligence to control the charging process based on a utility or asset owner controlling when the charging process is available—typically driven by a basic user profile or payment management. With a lack of intelligence, significant swings in the energy consumption of electric vehicles are possible (resulting in challenges for grid operators). Charging profiles based on schedules help address this issue, but are limited to scenarios where the ideal solution is simply to shift the load (shifting/shaping of the load is problematic in a scheduling scenario where future demand is not known). Furthermore, charging schedules are often not properly configured by end users resulting in non-optimum performance. Finally user profile/payment management systems limit the actions to demand response events or requests where a utility takes direct action on the charging system—the downside to these methods is that they are coarsely applied throughout a network, lack user feedback, and result in an inconvenience for the end user.

Therefore, there is a need for improvements to EVSE systems, such as residential EVSE systems including EVSE charging stations configured to electrically connect to an EV.

SUMMARY

Briefly described, aspects of the present invention relate to a smart learning electric vehicle charging system that uses automation routines to continuously balance the charging process based on end user and utility requirements. In particular, automated charging routines select a desired trade-off between a rate of charge, a cost of the rate of charge, and a variable such as tiered energy pricing based on inputs from utility and an end user. By effectively balancing these elements, the grid impacts, and consumer convenience of electric vehicle charging can be effectively balanced. One of ordinary skill in the art appreciates that such an electric vehicle charging system can be configured to be installed in different environments where electric vehicle charging is needed, for example, in residential electric vehicle charging systems or parking garages to automatically select a charging routine for an electric vehicle (EV) while balancing utility and user considerations.

In accordance with one illustrative embodiment of the present invention, an electric vehicle supply equipment (EVSE) charging system is provided. The system comprises an EVSE charging station that is configured to be coupled to an electric vehicle (EV). The system further comprises an EVSE cloud server coupled to the EVSE charging station optionally via a charge management network. The EVSE cloud server automatically determines a charging routine for the EV based on historic rate and charge data of the EV and enables a user to interactively modify the charging routine in real-time. The charging routine provides one or more charging options to the user based on a desired trade-off between different charging cost structures.

In accordance with another illustrative embodiment of the present invention, a method of charging an electric vehicle (EV) with an electric vehicle supply equipment (EVSE) charging station is provided. The method comprises automatically determining a charging routine for the EV based on historic rate and charge data of the EV with an EVSE cloud server coupled to the EVSE charging station optionally via a charge management network, enabling a user to interactively modify the charging routine in real-time and providing one or more charging options to the user based on a desired trade-off between different charging cost structures via the charging routine.

In accordance with yet another illustrative embodiment of the present invention, a non-transitory computer program product is provided which comprises a computer readable storage medium embodying computer program instructions which when executed by a cloud server in a demand response environment cause the cloud server to perform: automatically determining a charging routine for an electric vehicle (EV) based on historic rate and charge data of the EV, the cloud server coupled to an electric vehicle supply equipment (EVSE) charging station optionally via a charge management network, enabling a user to interactively modify the charging routine in real-time and providing one or more charging options to the user based on a desired trade-off between different charging cost structures via the charging routine.

DETAILED DESCRIPTION

To facilitate an understanding of embodiments, principles, and features of the present invention, they are explained hereinafter with reference to implementation in illustrative embodiments. In particular, they are described in the context of being custom learning routines of charging an EV by automatically selecting a charging routine for an EV based on historic data while balancing utility and user considerations in real-time. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

Utilizing a networked electric vehicle charger or networked electric vehicle (EV), a digital smart meter, a user input interface, e.g., via a smart phone, PC, or directly on the EV charger, a method is described to balance grid impact and customer convenience. In one embodiment, an intelligent smart electric vehicle charging station is networked with a smart meter on the premise, and is connected via a cloud application to an intelligent phone application. When a user plugs in their electric vehicle, historic charging patterns are assessed. A default assumption is made about the future needs of the consumer and is confirmed with a prompt to the user via a smart phone, display, or PC application. Based on responses and data gained from the utility, demand response network, historic rate information, and/or facility manager input, a cloud server application then automatically calculates the optimum time to recharge the EV. Throughout the charging process, changes can be pushed from either a utility or consumer to shift the changing process and profile based on requirements. Through this implementation, the electric vehicle is charged in a more efficient manner for both the user and the utility.

An electric vehicle supply equipment (EVSE) charging station may be accessible from remote web-connected computers, smart phones or tablets in order to provide the owner with a better way to monitor the status of the EV charging, schedule future charge events, and control the total kWh consumed and the cost of charging. An EV owner can better understand what they are spending to charge the vehicle as well as schedule charging process to be activated when rates are lowest. Furthermore, the system also allows utilities to offer programs that help manage the time and level of EV charging across the grid to increase grid reliability and efficiency while minimizing peak demand. Intelligence in EV charging stations means homeowners can reduce the cost of charging up to 60 percent by automatically charging during low energy rate periods, where such programs are available. Utilities can shift loads off critical peak periods to avoid the need for new generation sources. By using an EVSE cloud, utilities can offer rate programs to EV owners to allow the consumer to charge at highly attractive rates while simultaneously allowing the utility to manage the loads on the grid. By shifting each EV charging event slightly in time, utilities can potentially reduce the peak demand on the grid, which in turn helps to reduce the total amount of generation needed.

Accordingly, a smart learning electric vehicle charging system is described that can continuously balance the charging process based on end user and utility requirements. In one embodiment, automated methods select a proper trade-off between a rate of charge, a cost of the rate of charge, and a tiered energy pricing. In this way, the grid impacts and consumer convenience of electric vehicle charging are effectively balanced.

Figure 1:
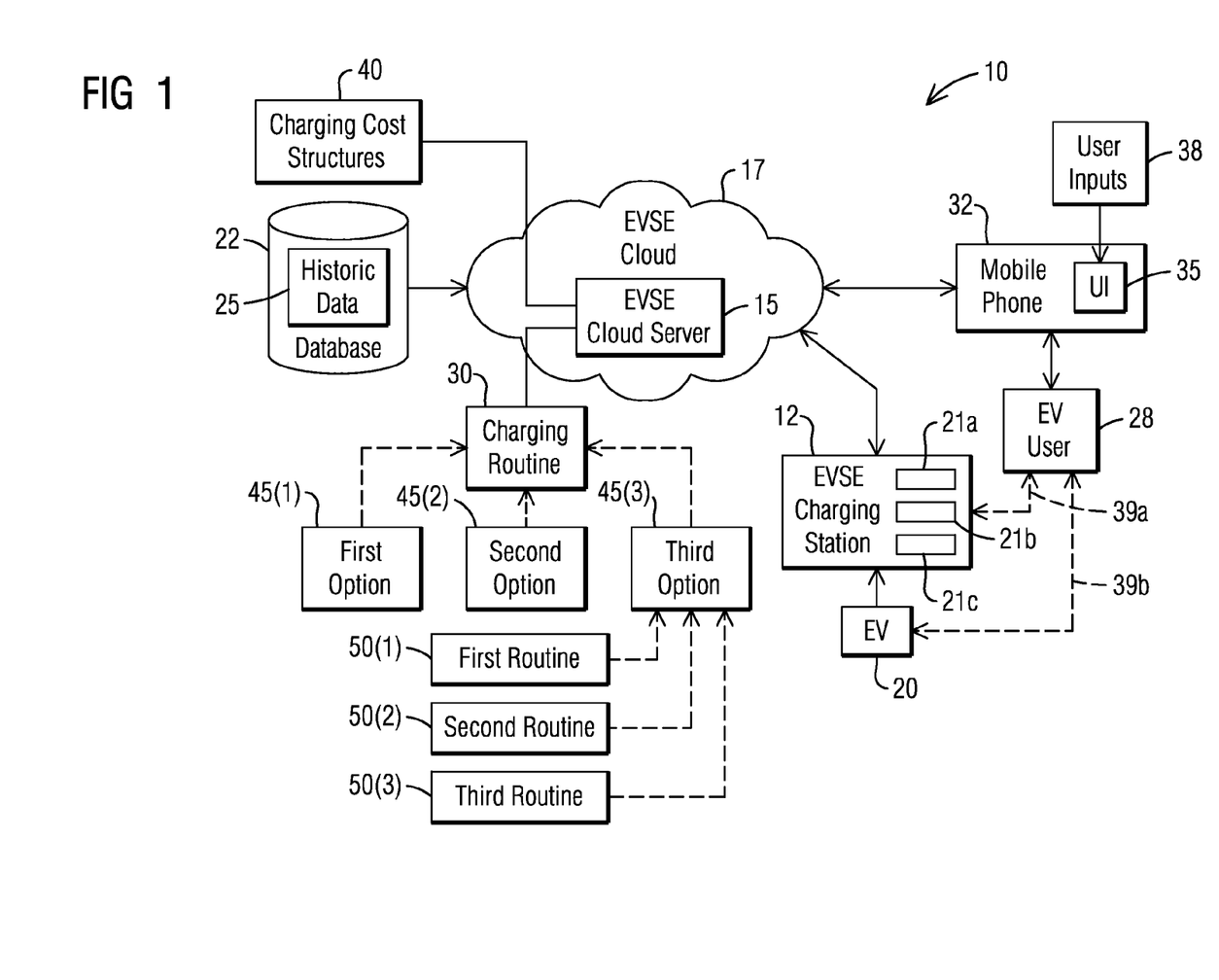
FIG. 1 illustrates a schematic diagram of an electric vehicle supply equipment (EVSE) charging system in accordance with an exemplary embodiment of the present invention.

FIG. 1 illustrates an embodiment of an electric vehicle charging system 10. The electric vehicle charging system 10 includes an electric vehicle supply equipment (EVSE) charging station 12 communicatively coupled to an electric vehicle supply equipment (EVSE) cloud server 15 in an EVSE cloud 17. The EVSE charging station 12 is configured to be coupled to an electric vehicle (EV) 20. The EVSE charging station 12 may be configured to couple to, and electrically charge, a power storage device (e.g., battery or batteries—not shown) of the EV 20. The EV 20 may be a fully-electric vehicle, as well as a hybrid vehicle. Electrical charging may be supplied to the EV 20 by the charging cable having an electrical connector (not shown) that electrically couples to a receiving connector (not shown) on the EV 20 (or the unit can be charged through alternative means such as inductive charging).

Embodiments of the present invention provide an intelligent vehicle charging using a networked electric vehicle (EV) or a networked electric vehicle supply equipment (EVSE) charging station. The EV 20 or EVSE charging station 12 can be networked to a utility via a demand response (DR) network, direct connection to utility head-end system, through a meter data management system, or indirectly through a third party/aggregator network. For the purposes of simplicity this networked EV or EVSE is referred to as the EVSE cloud 17.

Consistent with some embodiments of the present invention, the demand response network may enable DR deployment methods using an Automated Demand Response (ADR) client application, e.g., to provide automated demand response using OpenADR. Developed by the Demand Response Research Center (DRRC), OpenADR is a communications data model designed to facilitate sending and receiving DR signals between a utility or independent system operator (ISO) and electric customers. The data model interacts with building control systems that are pre-programmed to take action based on a DR signal, enabling a DR event to be fully automated, with no manual intervention. DR is an action taken to reduce electricity demand in response to price, monetary incentives, or utility directives so as to maintain reliable electric service or avoid high electricity prices. Participants of DR events agree under contracts with utilities to carry out various demand response control strategies to curb their electrical demand (kW) in order to gain financial benefits, which typically are received through incentives and reduction in electrical costs. Utilities may establish DR programs to: motivate changes in electric consumption by customers in response to changes in the price of electricity over time and motivate lower electricity use at times of high market prices or when grid reliability is jeopardized by providing incentive payments.

In some embodiments, a communication gateway 21a may be used by the smart EVSE charging station 12 to communicate charging data with the EVSE cloud server 15. The communication gateway 21a may provide a gateway for communication of the smart EVSE charging station 12 with the EVSE cloud server 15, such as through the internet. In one or more embodiments, the communication gateway 21a may be configured and operable to receive certain data (e.g., signal packets) from the EVSE cloud server 15. For example, on one or more embodiments, the data received from the EVSE cloud server 15 may concern at least one of: load control and charging routines having schedules and priorities.

The EVSE cloud server 15 may receive charging data from, and communicate with, other smart EVSE charging stations coupled to a power grid. A single cloud server 15 may be in communication with hundreds or thousands of smart EVSE charging stations like smart EVSE charging station 12. Multiple EVSE cloud servers 15 may be provided to communicate with different areas of the power grid. The charging data that is sent periodically may be stored in memory of the EVSE cloud server 15 and may, in some embodiments, be accessed by a user via a communication device. In one or more embodiments, the charging data may be accessed from the EVSE cloud server 15 by a utility server and compiled to gain understanding of the amount of load being drawn in respective areas of the power grid and by what types of devices.

The EVSE cloud server 15 at least one processing unit and memory. The processing unit executes computer-executable instructions and may be a real or a virtual processor. In a multi-processing system, multiple processing units execute computer-executable instructions to increase processing power. The memory may be volatile memory (e.g., registers, cache, RAM, DRAM, SRAM), non-volatile memory (e.g., ROM, EEPROM, flash memory), or some combination of the two. The memory can store software for implementing one or more of the described techniques for operating or using the disclosed electric vehicle charging systems. For example, the memory can store software for implementing any of the disclosed methods and their accompanying user interfaces. When executed, the software can be used to implement the functionality of the EVSE cloud server 15.

The EVSE cloud server 15 can be implemented using a wide variety of computers and/or servers (e.g., a suitable commercially available server). The EVSE cloud server 15 includes cloud server software, which can comprise computer-executable instructions stored on non-transitory computer-readable media (e.g., any one or more of the non-transitory computer-readable media described above). When executed, the software can be used to implement the functionality of the cloud server. The EVSE cloud server 15 may use user data. The EVSE user data can comprise data stored on non-transitory computer-readable media that is related to users of the EVSE cloud server 15. For example, the data can include data about a user's identification, address, account credit balance, usage history, vehicle, and/or other such user data.

The EVSE charging station 12 may include a charge control device 21b that is operable to process a control signal (e.g., a charge signal) representative of a maximum electrical charge current to be communicated to the EV 20, and that charge signal may be received from a communication interface. The charge control device 21b may communicate the maximum electrical charge current that can be drawn by the EV 20 through a charge cable. The EVSE charging station 12 may include a metering device 21c that is operable to receive charging information, such as from a sensor and/or voltage tap in the EVSE charging station 12. The metering device 21c may also function to calculate one or more additional usage parameters, such as charge power usage or charge energy usage, such as from the measured values of charge current and/or charge voltage.

The EVSE cloud 17 may be coupled to a database (dB) 22 that stores historic rate and charge data 25. The EVSE cloud 17 serves as the source point for collecting the historic rate and charge data 25. The historic rate and charge data 25 includes historic charging data for an individual charging site including: time of day, length of charge, rate of charge, vehicle type, user information, utility rate information, and pricing signals (demand response, time of use pricing signals, real time pricing etc). In one embodiment, the historic rate and charge data 25 may be based on historical timestamps, a user profile, an EV profile and utility rate profiles.

In operation, the EVSE cloud server 15 may automatically determine a charging routine 30 for the EV 20 based on the historic rate and charge data 25 of the EV and enable an EV user 28 to interactively modify the charging routine 30 in real-time. In one embodiment, an intelligent smart electric vehicle charging station such as the EVSE charging station 12 is connected via a cloud application to an intelligent phone application. For example, a mobile phone 32 may include a user interface (UI) 35 to receive user inputs 38 from the EV user 28 to customize the charging routine 30 on the fly.

The mobile phone 32 may be communicatively coupled to the EVSE cloud server 15 via the EVSE cloud 17. The EVSE cloud 17 is capable of communication to the EV user 28 such as the EV driver's smart phone, e.g., the mobile phone 32 or to the displays located on either the EVSE charging station 12 (as shown by a dotted link 39a) or internal to the electric vehicle 20 (as shown by a dotted link 39b). These locations serve as a potential point for the EV driver to issue feedback as the user inputs 38 to the EVSE cloud 17 based on their current need.

Where applicable a remote PC/tablet connection/smart watch may also be present in some embodiments of the present invention. In alternative embodiments, the EVSE charging station 12 or EV 20 can communicate indirectly to the EVSE cloud 17 through either a smart meter or a home automation network.

When a user plugs in their electric vehicle 20, historic charging patterns are assessed by the EVSE cloud server 15 from the dB 22 by accessing the historic rate and charge data 25. A default assumption is made about the future needs of the EV user 28 and is confirmed with a prompt to the EV user 28 via the mobile phone 32. Based on the user inputs 38 and data gained from the utility as charging cost structures 40 via a demand response network, and the required time to charge the EV 20, the historic rate and charge data 25, and/or facility manager input, the EVSE cloud server 15 as a cloud server application then automatically calculates the optimum time to recharge the EV 20 and provides the charging routine 30. The charging cost structures 40 may be provided by a utility to enable tailoring of a charging process. In one embodiment, the charging cost structures 40 may be based on a rate of charge, a cost of the rate of charge and a variable energy pricing. An example of the variable energy pricing is a tiered energy pricing. Examples of the charging cost structures 40 may include rapid charging at a higher charge rate of $3.10 (see FIG. 8A) or much balanced charging at a lower charge rate of $2.25 (see FIG. 8B) etc.

According to one exemplary embodiment, the charging routine 30 provides first, second, third charging options 45(1), 45(2), 45(3) to the EV user 28 based on a trade-off between different charging cost structures 40. The first charging option 45(1) entails charging with almost no regard to the cost of charging the EV 20. The second charging option 45(2) entails charging that targets managing demand charge costs. The third charging option 45(3) entails charging that targets arbitraging charging activity and managing demand charge costs. The third charging option 45(3) to charge includes a first routine 50(1) that both limits power of charging and delays charging, a second routine 50(2) that prioritizes between limiting power of charging and delaying charging and a third routine 50(3) that does not limit power of charging and does not delay charging.

Figure 2:
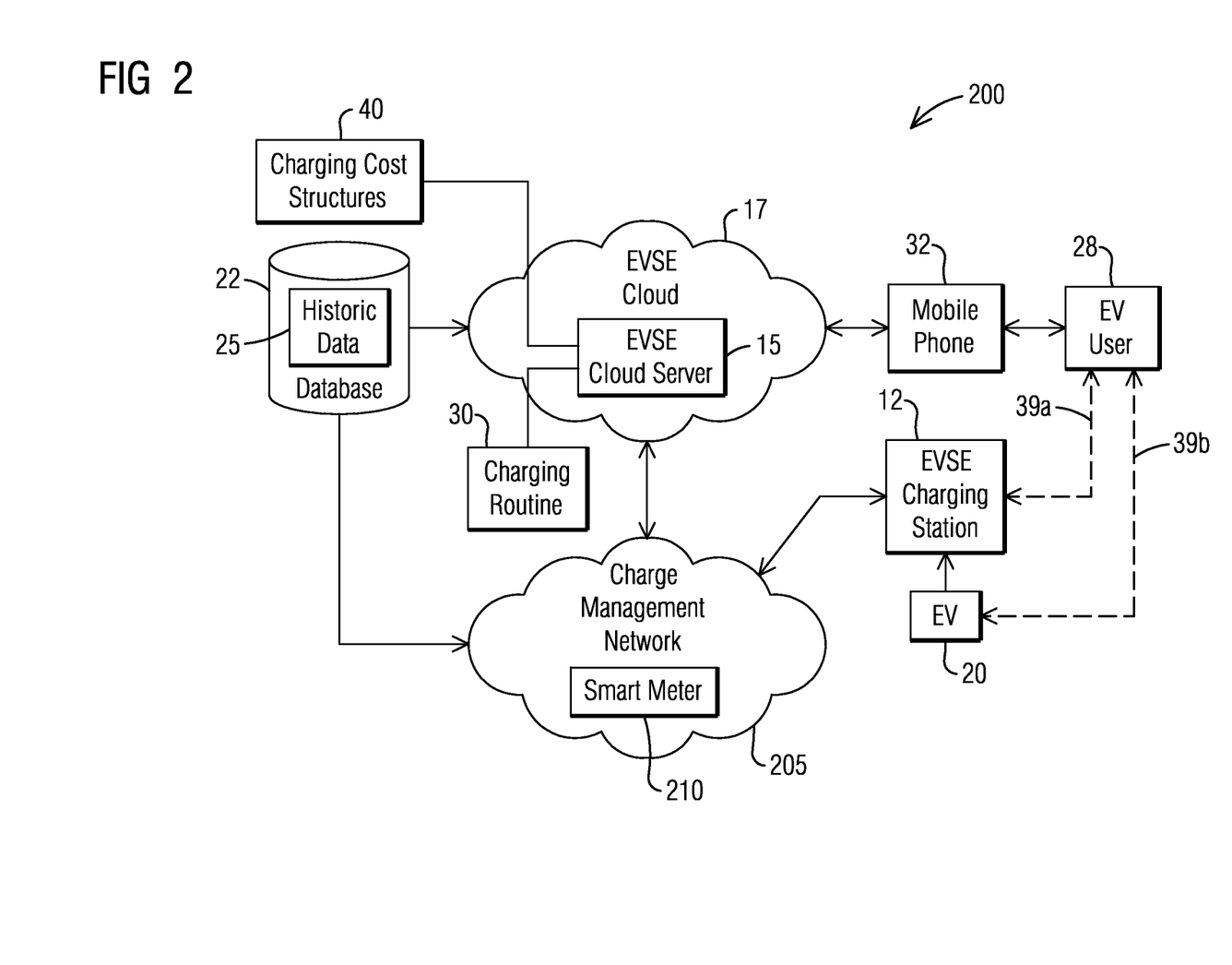
FIG. 2 illustrates a schematic diagram of an alternate configuration of an electric vehicle supply equipment (EVSE) charging system in accordance with another embodiment of the present invention.

FIG. 2 illustrates a schematic diagram of an alternate configuration of an electric vehicle supply equipment (EVSE) charging system 200 in accordance with another embodiment of the present invention. The EVSE charging system 200 includes the EVSE charging station 12 configured to be coupled to the electric vehicle (EV) 20. The EV 20 or EVSE charging station 12 can be networked to any of a plurality of charge management networks. For example, the EVSE charging system 200 further includes the EVSE cloud server 15 coupled to the EVSE charging station 12 via a charge management network 205. Examples of the charge management network 205 include an electric vehicle charging network, a utility meter data network, a vehicle telematics network, a $3^{rd}$ party network, a building management/energy management network, or a parking/facility manager network.

The charge management network 205 may include a smart meter 210 coupled to the EVSE charging station 12 and a power grid (not shown). In this embodiment, instead of the EVSE cloud 17 the smart meter 210 may provide the historic rate and charge data 25 of the EV 20 to the EVSE cloud server 15.

Figure 3:
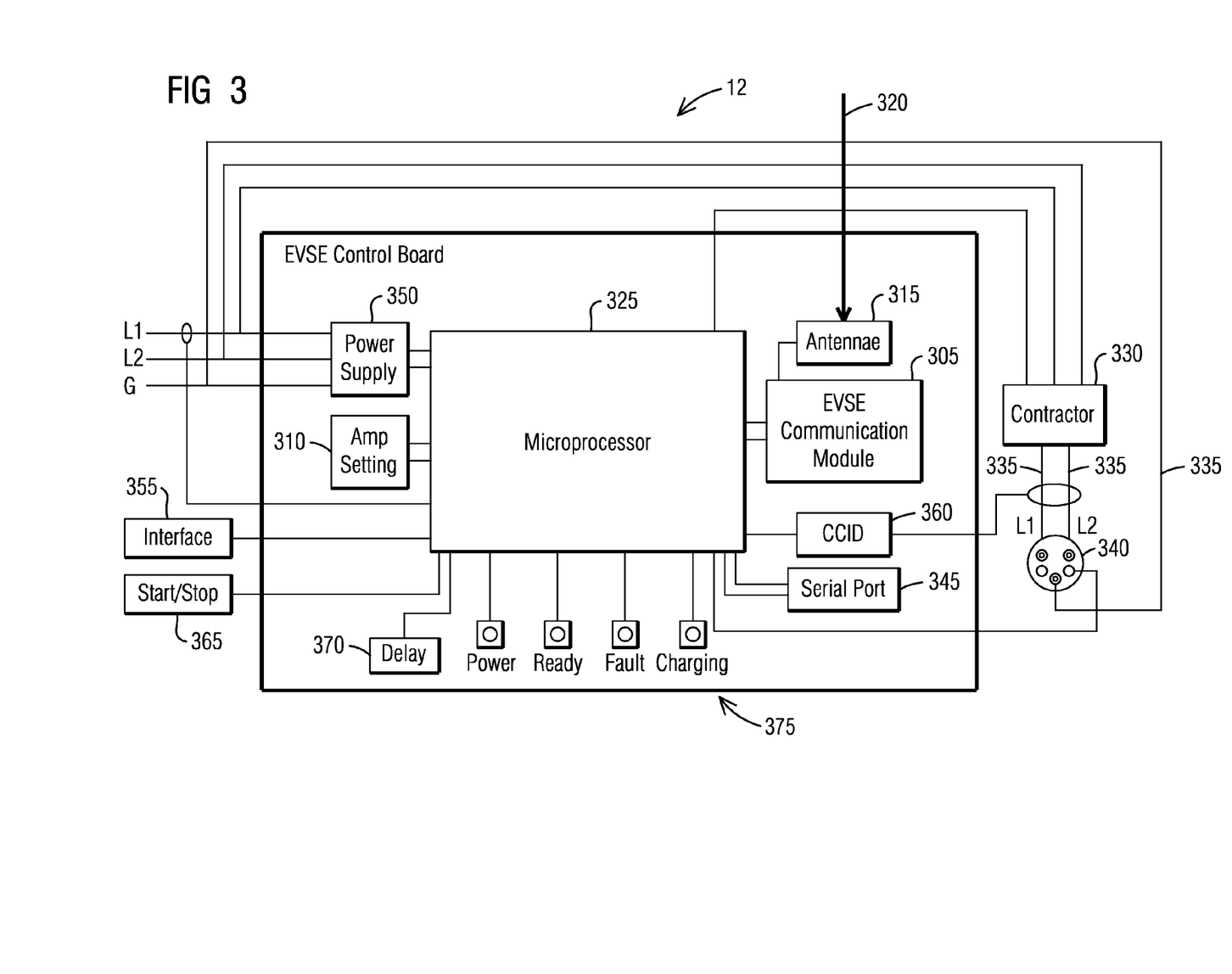
FIG. 3 illustrates an electrical block diagram of an Electric Vehicle Supply Equipment (EVSE) charging station of FIGS. 1 and 2 in accordance with an exemplary embodiment of the present invention.

FIG. 3 illustrates an electrical block diagram of the electric vehicle supply equipment (EVSE) charging station 12 of FIGS. 1 and 2 in accordance with an exemplary embodiment of the present invention. The EVSE charging station 12 includes a communication module 305. For example, the communication module 305 may be a wireless communication module (wi-fi, Wi-max, 900 MHz mesh etc.). However, it should be recognized that the communication module 305 of the EVSE charging station 12 may be a PLC if the communication is wired or a structured wire port (hardwired Ethernet). The EVSE charging station 12 may also include an amperage setting switch 310 that functions to further limit the maximum amperage that the EV 20 can request from a load center.

An antenna 315 connected to the communication module 305 is adapted to receive a wireless signal 320 from other communication module. The received signal 320 is indicative of a maximum charge output setting for the EVSE charging station 12. A microprocessor 325 then sets a maximum amperage output for the ESVE charging station 12 by communicating this maximum amperage setting to the EVSE charging station 12 via industry standard protocol SAE J1772. A contactor 330 is connected to a charge cable 335, which terminates at a EVSE connector 340. The EVSE connector 340 may be a SAE J1772 connector and is adapted to couple to a receiving connector on the EV 20 (FIG. 1). The ESVE charging station 12 may further include a serial port 345, such as a differential serial port RS485 for data communication, suitable power supply and conditioning 350, a user interface 355 for user input to the EVSE charging station 12, a Circuit Card Interface Device (CCID) 360 to provide feedback information about the level of charge, a start/stop button 365, a delay 370 to enable delayed charging for an amount of delay time, and other indicators 375 adapted to indicate whether the EVSE charging station 12 is powered, ready, in a fault condition, or is charging.

Figure 4:
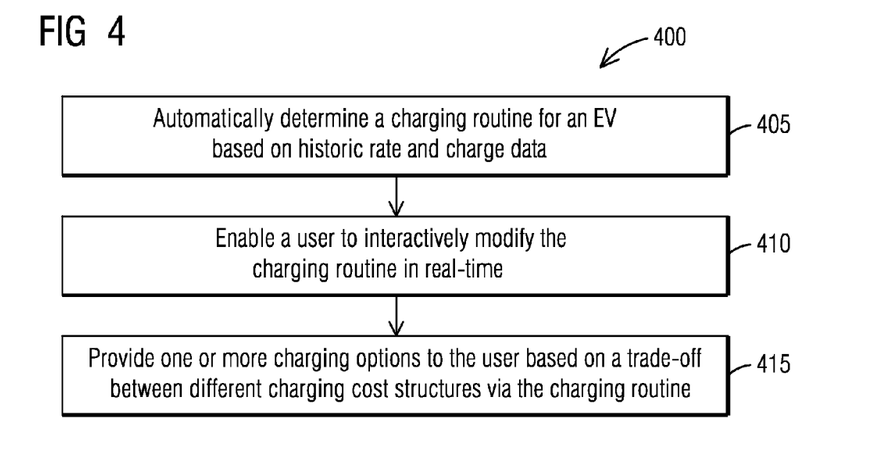
FIG. 4 illustrates a flow chart of a method for automatically selecting a charging routine for an EV while balancing utility and user considerations in accordance with an exemplary embodiment of the present invention.

FIG. 4 illustrates a flow chart of a method 400 for automatically selecting a charging routine for the EV 20 while balancing utility and user considerations in accordance with an exemplary embodiment of the present invention. Reference is made to the elements and features described in FIGS. 1-3. It should be appreciated that some steps are not required to be performed in any particular order, and that some steps are optional.

In step 405, the EVSE cloud server 15 may automatically determine the charging routine 30 for the electric vehicle (EV) 20 based on the historic rate and charge data 25 of the EV 20. The EVSE cloud server 15 may be coupled to the electric vehicle supply equipment (EVSE) charging station 12 optionally via the charge management network 205, as shown in FIG. 2. In step 410, the EVSE cloud server 15 may enable the EV user 28 to interactively modify the charging routine 30 in real-time, as described above. In step 415, the EVSE cloud server 15 may provide one or more charging options 45(1-3) to the EV user 28 based on a desired trade-off between different charging cost structures 40 via the charging routine 30.

Figure 5:
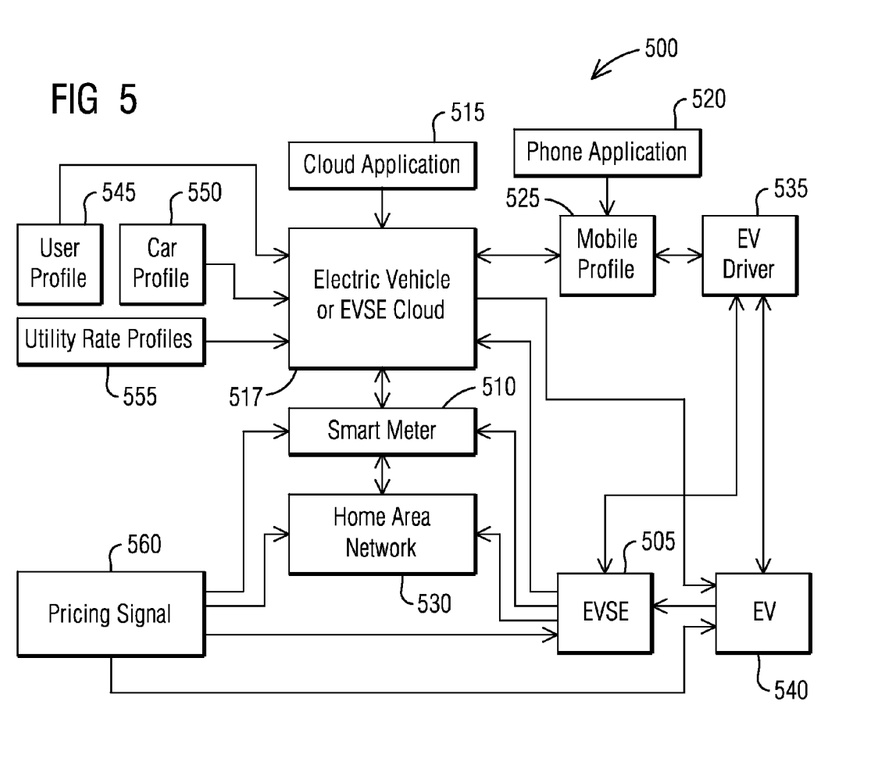
FIG. 5 illustrates a schematic diagram of an alternate configuration of an electric vehicle supply equipment (EVSE) charging system in accordance with yet another embodiment of the present invention.

FIG. 5 illustrates a schematic diagram of an alternate configuration of an electric vehicle supply equipment (EVSE) charging system 500 in accordance with yet another embodiment of the present invention. In this embodiment, an intelligent smart electric vehicle supply equipment (EVSE) charging station 505 is networked with a smart meter 510 on the premise, and is connected via a cloud application 515 at an EV or EVSE cloud 517 to an intelligent phone application 520 resident at a mobile phone 525. The cloud application 515 can comprise computer-executable instructions stored on non-transitory computer-readable media (e.g., any one or more of the non-transitory computer-readable media described above). When executed, the software can be used to implement the functionality of an EVSE server.

The smart meter 510 may be coupled to a home area network 530 which in turn connects to the EVSE charging station 505. An EV driver 535 of an EV 540 may communicate with the EVSE charging station 505. By using the mobile phone 525, the EV driver 535 may interface with the EVSE cloud 517. In some embodiments, the EV driver 535 may set the charging routine 30 regarding at what times, for how long, and at what maximum charge (e.g., Amps or % of full charge) to allow the EVSE charging station 505 to charge the EV 540. The charging routine 30 may be set using the phone application 520 or through communication directly with the EVSE charging station 505 via a computer and the home area network 530. The EV driver 535 may operate the phone application 520 that is downloaded to the mobile phone 525. The phone application 520 may be written in JavaScript using a framework such as Apache Cordova™ or an object-oriented language such as Objective-C for OS X and iOS for Apple. Using the phone application 520, the EV driver 535 may access the charging routine 30.

A user profile 545, a vehicle profile 550, and utility rate profiles 555 may be provided to the EVSE cloud 517. A pricing signal 560 from a utility may be sent to the smart meter 510, the home area network 530, the EVSE charging station 505 and the EV 540. In one embodiment, the user profile 545, the vehicle profile 550, and the utility rate profiles 555 may represent the historic rate and charge data 25 while the pricing signal 560 may represent the charging cost structures 40 (FIG. 1).

Figure 6A:
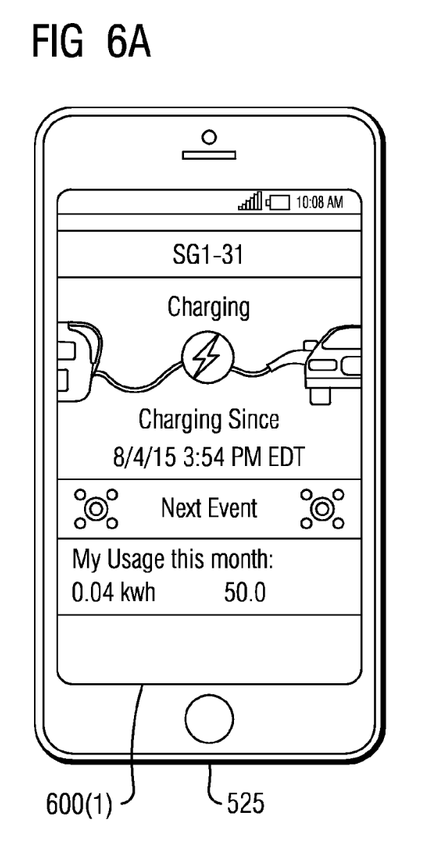
FIGS. 6A-6C illustrate graphically user interfaces of an intelligent phone application resident at a mobile phone for controlling charging of an EV in accordance with an exemplary embodiment of the present invention.
Figure 6B:
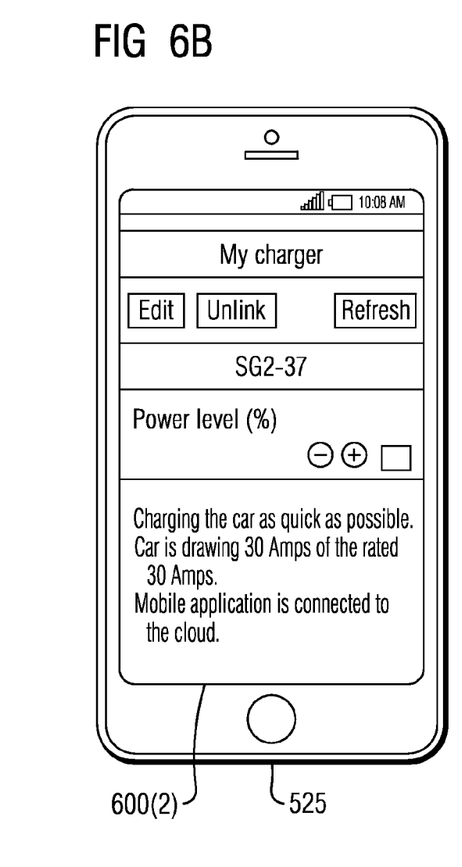
Figure 6C:
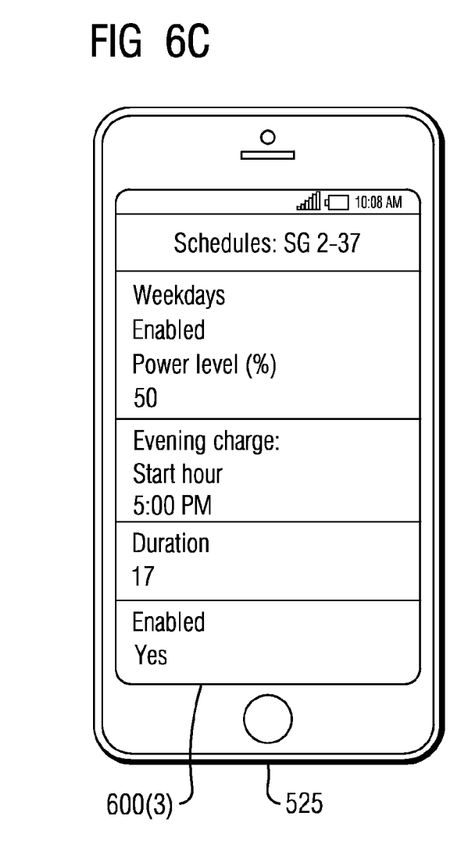

FIGS. 6A-6C illustrate graphically user interfaces 600(1-3) of the intelligent phone application 520 resident at the mobile phone 525 for controlling charging of the EV 540 in accordance with an exemplary embodiment of the present invention. The user interface 600(1) is provided for monitoring one's charging. By using this interface, the EV driver 535 can easily view and monitor the status of the EVSE charging station 505. The user interface 600(2) is provided for adjusting one's settings. By using this interface, the EV driver 535 can adjust the kilowatt charging rate based on one's power and infrastructure needs. The user interface 600(3) is provided for setting and forgetting one's charging. By using this interface, the EV driver 535 can take control of one's charging schedule.

Figure 7:
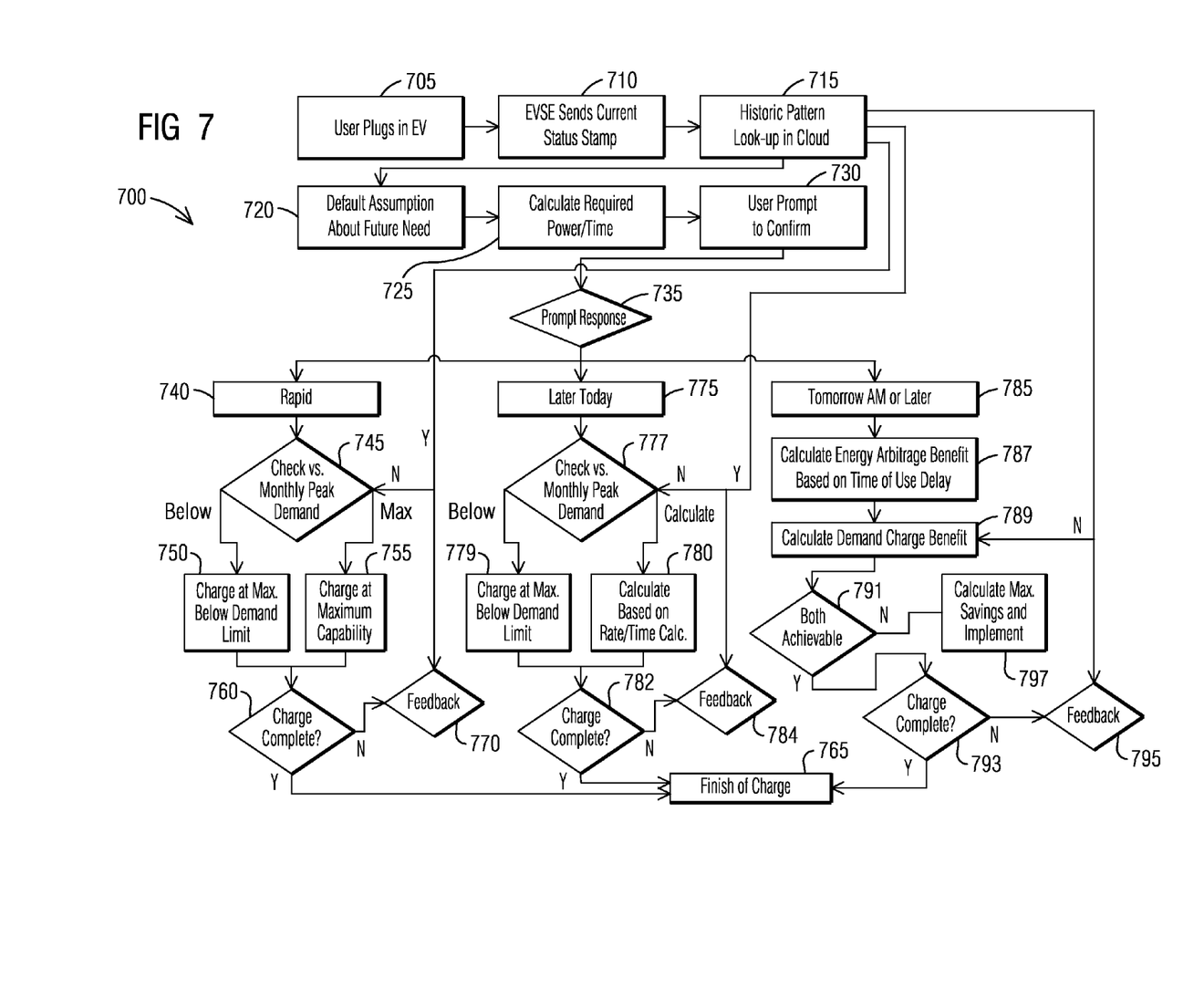
FIG. 7 illustrates a flow chart of a detailed method for automatically selecting a charging routine for an EV by balancing utility and user considerations in accordance with an exemplary embodiment of the present invention.

FIG. 7 illustrates a flow chart of a detailed method 700 for automatically selecting the charging routine 30 of FIG. 1 for the EV 540 by balancing utility and user considerations in accordance with an exemplary embodiment of the present invention. Reference is made to the elements and features described in FIGS. 1-6. It should be appreciated that some steps are not required to be performed in any particular order, and that some steps are optional.

In step 705, the EV driver 535 arrives at home/building site and plugs in their electric vehicle 540. When the EV driver 535 first plugs in, a timestamp is recorded at step 710 with the current time of day, day of the week, current battery level, information about the charging capability of the setup (rate of charge of EV and EVSE charging station), user information, and vehicle information (conveying battery size, rate of permissible charge, and other battery constraints). These data sets are fed to the EVSE cloud application 515. The EVSE cloud application 515 then assesses the current time the EV charging station 505 has been plugged into and compares it in step 715 to the historical rate and charge data 25 sets within a statistically significant window based on the day of the week. After searching through the history to determine other relevant timestamps, at step 720, the EVSE cloud application 515 makes a default assumption about the future need of charging.

In step 725, the EVSE cloud application 515 then calculates a typical time when the EV 540 will be next unplugged (this time is assigned the name of "EVSE predicted finish"). Historical timestamps are then resolved into three buckets denoting the relative time when the EV 540 would later be required. In the first bucket, called rapid, it is assumed that the EVSE charging station 505 will be needed again before the EV 540 has reached a near full charge level. The second bucket, called later today, refers to a time block where it is achievable to fully fill the EV battery, but only at a high rate of charge (power level denoted at 6.6 kW in the introduction). The later today bucket is also utilized if the utility has flat rate energy pricing. The third bucket, called tomorrow AM, refers to a scenario where both arbitrage benefit (capitalizing on different energy prices on time of day) or demand charge and arbitrage management may apply. The EVSE cloud application 515 also has access to the critical parameters that assist in the calculation of optimum economics, specifically energy rates versus time, applicable demand charges, energy tiers, and other incentives.

With these parameters in mind, the EVSE cloud application 515 then proposes the charging routine 30, calculates when the electric vehicle 540 will be ready, and at step 730 conveys the results back to the EV driver 535 via the EV display, EVSE display, the phone application 520, and/or PC/tablet application. If, in step 735, the user confirms the action or ignores the request, the automated, learned charging process begins in accordance with the plan. The automated routine cycles on a rapid interval based on the calculation of demand charges in the service territory (for example 1 minute intervals for the scenario of 15 min windows for demand charge calculation). Assuming no change in the demand calculation, the routine continues to completion. If loading in the house/building changes, the planned charging rates are recalculated and updates are sent to the user. Throughout the process, users can override the automated routines through the EV display/buttons, EVSE display/buttons, the phone application 520, and/or PC/tablet application.

In one embodiment, the charging routines of optimization may vary among three charging options or categories of Rapid, Later Today, and Tomorrow AM. For the Rapid routine, the learning is based upon user tolerance for small shavings of peak power below the maximum rate of the EV 540/EVSE charging station 505. While these small reductions have little effective impact on the rate of charge, these small decreases can serve as both an effective demand response profile for load balancing and can provide impactful grid services in demand response requests. To create a learning routine for the Rapid routine, the charger, i.e., EVSE charging station 505 is set slightly below the peak charging rate with prompts to the EV driver 535 clarifying the rate of charge. If the EV driver 535 does not interact with the EVSE cloud application 515, the rate of charge is assumed as permissible and becomes the default charging rate. If the EV driver 535 does interact with the EVSE cloud application 515 (and override the default setting), a record of the override is captured. During subsequent charging sessions with a comparable timestamp, the rate of charge is set closer to the maximum rate. This pattern replicates until the EVSE cloud application 515 instructed charging rate matches the maximum rate possible from the EV 540/EVSE charging station 505 combination.

In step 740, the EVSE cloud application 515 may select the charging option "Rapid" for the charging routine 30. At a decision point 745 next a check may be done by comparing the peak demand request to the monthly peak demand. If the peak demand request is higher than the observed month-to-date actual monthly peak demand and previous tries during the monthly completed successfully, at step 750, the charging routine 30 may charge at maximum slightly below the maximum demand limit. Otherwise, if the peak demand request is lower than the monthly peak demand, at step 755, the charging routine 30 may charge at the maximum capability. A check as to completion of the charge may be made next at a decision point 760. If, the outcome of this check is affirmative the charging process finishes at step 765. Instead, when the outcome is negative meaning charging did not finish properly a feedback may be provided at a decision point 770.

In the routine of Later Today, the primary factor to be managed is the potential for demand charges (since by definition this bucket is not concerned with energy arbitrage). With this goal in mind, the EVSE cloud application 515 reads in the historic demand charges for the home/building (typically from a smart meter or sub-meter) and compares this value to the EVSE predicted finish. By default, the EVSE cloud application 515 will assume the user is targeting demand charge management (to save money) and will calculate the maximum rate of charge that will prevent the whole home/building meter from reaching a new peak demand level. If the EV 540/EVSE charging station 505 does not influence this level, the charging rate will be set at a maximum. This routine will continue to iterate at a rate based on the time interval of the home/building meter (15 minute average peak is common). Once the EV 540 is charged, the routine stops. If at any point in the charging process, a user interacts with the charger and increases the rate of charge, the EVSE cloud application 515 will record the override. In this way, demand loading changes in the home/building are reflected in the charging routine and still allow for the rapid charging of the EV 540. If by chance, the user has an incident that redefines the peak charging rate, this routine captures this new peak demand level and adapts to that new value. The observed effective is that the routine would allow for more rapid charging throughout the remainder of the billable period (typically 1 month). Finally, if the overrides exceed a defined threshold (example a user is continuously increasing the rate of charge), the EVSE cloud application 515 will default to charging at a maximum or higher rate.

In step 775, the EVSE cloud application 515 may select the charging option "Later Today" for the charging routine 30. At a decision point 777 next a check may be done by comparing the peak demand request to the monthly peak demand. If the peak demand request is higher than the monthly peak demand, at step 779, the charging routine 30 may charge at maximum below a demand limit. Otherwise, if the peak demand request is lower than the monthly peak demand, at step 780, the charging routine 30 may calculate charging based on a rate/time calculation. A check as to completion of the charge may be made next at a decision point 782. If, the outcome of this check is affirmative the charging process finishes at step 765. Instead, when the outcome is negative meaning charging did not finish properly a feedback may be provided at a decision point 784.

In the third routine called Tomorrow AM there is the potential to both arbitrage the charging activity (by a delay in when the charging process begins) and to manage the demand charge costs. The arbitrage process exists when the charging process can delay the beginning of charging until a later time and can then charge at either a maximum or balanced rate. An example of arbitrage would include the scenario where the EV 540 is plugged in at 5 PM, but sits without charging until energy rates become cheaper at midnight and then charges until 5 AM.

In one embodiment, in the Tomorrow AM routine there may be three potential sub-routines: 1) There is adequate time to both demand/power limit the charger and delay charging, 2) priority between these two actions is required, or 3) neither is possible (in which case the charger is actually in the "rapid" routine). To determine what scenario the EV 540/EVSE charging station 505 is in, the EVSE cloud application 515 first calculates the dollar value of an arbitrage event, specifically it calculates the difference in energy rates multiplied by the amount of charge that could delivered to the EV 540 in that window. If the time window is not wide enough to full charge the EV 540 within the low cost window, the arbitrage amount is only based upon the energy within the time window. The EVSE cloud application 515 then compares this benefit with the benefit of charging the EV 540 at a lower rate of charge (rate of charge impact factors in the rate requirement both within the lower cost charging window and outside of it). If the time between the start of the lower energy price band and the EVSE predicted finish is wide enough, it may be possible to both limit the rate of charge and delay the charge. If this window is not wide enough, the EVSE cloud application 515 calculates the optimum charge rate that balances the peak demand charge versus the energy savings due to arbitrage. If by chance, demand charges are more valuable throughout the entire process, then the routine effectively defaults back to the "Later Today" routine. Similar to previous routines, user overrides are permissible. If the user does override the charging process either based on the time of day or rate of charge, these values are recorded and help to establish new limits on the arbitrage delay or minimum rate of charge.

In step 785, the EVSE cloud application 515 may select the charging option "Tomorrow AM" for the charging routine 30. At step 787 next the charging routine 30 may calculate energy arbitrage benefit based on time of use delay. Next in step 789 the charging routine 30 may calculate demand charge benefit. At a decision point 791, a check is made as to whether both benefits are achievable. If yes is the answer, then at a decision point 793 a check as to completion of the charge may be made. If, the outcome of this check is affirmative the charging process finishes at step 765. Instead, when the outcome is negative meaning charging did not finish properly a feedback may be provided at a decision point 795. In case the outcome was no at the decision point 791 at step 797, maximum savings are calculated and the charging routine 30 is implemented.

In this way, a combination of the Rapid, Later Today, and Tomorrow AM routines may create a scenario where energy savings and grid benefits can be realized with an electric vehicle charging station. The numerous inputs as user feedback enable a system that responds or learns to individual usage patterns and creates a solution that is optimized for both the end user and the utility.

Figure 8A:
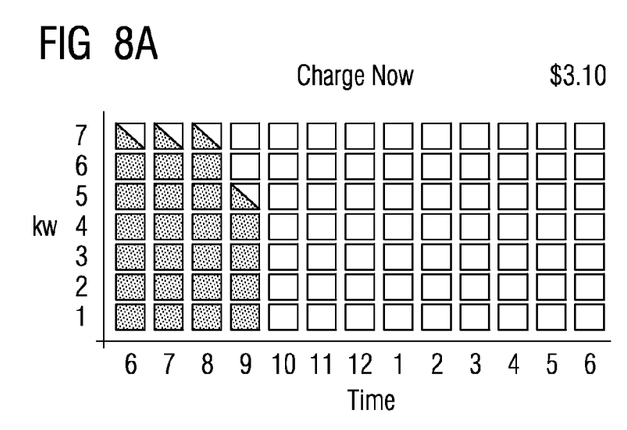
FIGS. 8A-8D illustrate graphically custom learning routines of charging an EV in accordance with an exemplary embodiment of the present invention.
Figure 8B:
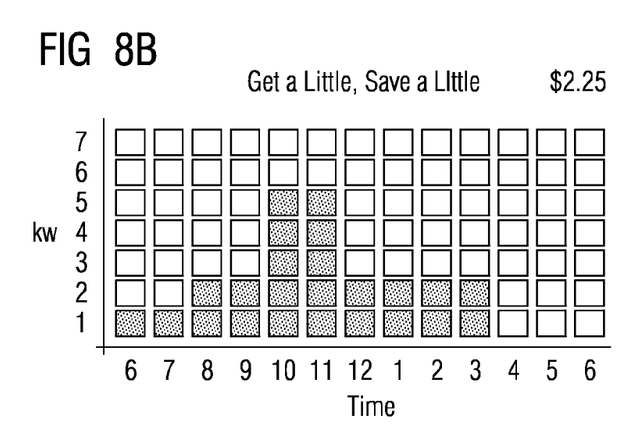
Figure 8C:
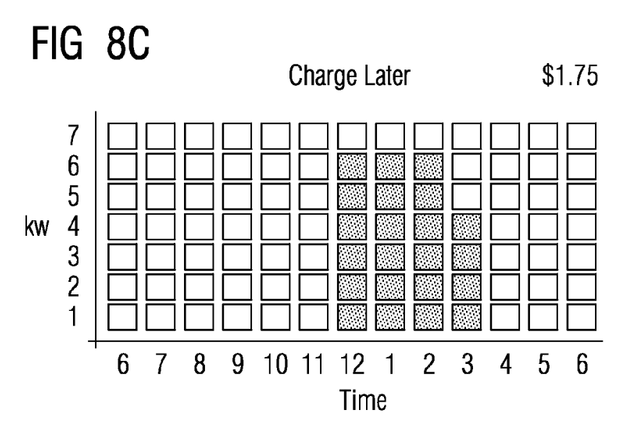
Figure 8D:
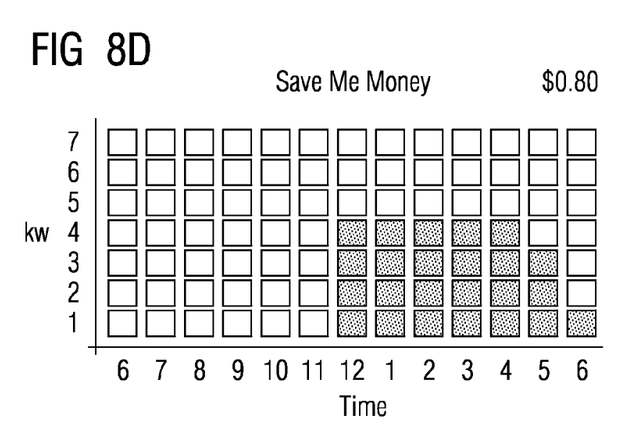

FIGS. 8A-8D illustrate graphically custom routines of charging the EV 540 in accordance with an exemplary embodiment of the present invention. FIG. 8A illustrates graphically a "rapid" routine of charging now the EV 540. The filled boxes in first four columns represent the kW/hr usage at 6 pm-9 pm between the hours of 6 pm to 6 am with maximum 7 kW charge per hour available or possible. FIG. 8B illustrates graphically a "Later Today" routine of charging the EV 540. The filled boxes in columns 6 pm-3 am represent the kW/hr usage with maximum 7 kW charge per hour. FIG. 8C illustrates graphically a "Later Today" routine of charging the EV 540 with no demand charge and saving if electricity cheaper after midnight. The filled boxes in four columns of 12 am-3 am represent the kW/hr usage with maximum 7 kW charge per hour. FIG. 8D illustrates graphically a "Tomorrow AM" routine of charging the EV 540. The filled boxes in last seven columns 12 am-6 am represent the kW/hr usage with maximum 7 kW charge per hour.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Although the steps, operations, or computations may be presented in a specific order, this order may be changed in different embodiments. In some embodiments, to the extent multiple steps are shown as sequential in this specification, some combination of such steps in alternative embodiments may be performed at the same time.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. An electric vehicle supply equipment (EVSE) charging system comprising:
    an EVSE charging station configured to be coupled to an electric vehicle (EV); and
    an EVSE cloud server coupled to the EVSE charging station optionally via a charge management network,
    wherein the EVSE cloud server to automatically determine a charging routine for the EV based on historic rate and charge data of the EV and enable a user to interactively modify the charging routine in real-time,
    wherein the charging routine to provide one or more charging options to the user based on a desired trade-off between different charging cost structures,
    wherein the one or more charging options includes an option to charge that targets arbitraging charging activity and managing demand charge costs, and
    wherein the option to charge includes a first routine that both limits power of charging and delays charging, a second routine that prioritizes between limiting power of charging and delaying charging and a third routine that does not limit power of charging and does not delay charging.

2. The system of claim 1, wherein the historic rate and charge data is based on historical timestamps, a user profile, an EV profile and utility rate profiles.

3. The system of claim 1, further comprising:
    a smart meter coupled to the EVSE charging station and a power grid, the smart meter to provide the historic rate and charge data of the EV.

4. The system of claim 1, wherein the different charging cost structures are provided by a utility to enable tailoring of a charging process.

5. The system of claim 1, wherein the different charging cost structures are based on a rate of charge, a cost of the rate of charge and a variable energy pricing.

6. The system of claim 5, wherein the variable energy pricing is a tiered energy pricing.

7. The system of claim 1, wherein the one or more charging options includes a first option to charge with all most no regard to the cost of charging the EV.

8. The system of claim 1, wherein the one or more charging options includes a second option to charge that targets managing demand charge costs.

9. A method of charging an electric vehicle (EV) with an electric vehicle supply equipment (EVSE) charging station, the method comprising:
    automatically determining a charging routine for the EV based on historic rate and charge data of the EV with an EVSE cloud server coupled to the EVSE charging station optionally via a charge management network;
    enabling a user to interactively modify the charging routine in real-time; and
    providing one or more charging options to the user based on a desired trade-off between different charging cost structures via the charging routine,
    wherein the one or more charging options includes an option to charge that targets arbitraging charging activity and managing demand charge costs, and
    wherein the option to charge includes a first routine that both limits power of charging and delays charging, a second routine that prioritizes between limiting power of charging and delaying charging and a third routine that does not limit power of charging and does not delay charging.

10. The method of claim 9, wherein the historic rate and charge data is based on historical timestamps, a user profile, an EV profile and utility rate profiles.

11. The method of claim 9, further comprising:
    coupling a smart meter to the EVSE charging station and a power grid, the smart meter to provide the historic rate and charge data of the EV.

12. The method of claim 9, wherein the different charging cost structures are provided by a utility to enable tailoring of a charging process.

13. The method of claim 9, wherein the different charging cost structures are based on a rate of charge, a cost of the rate of charge and a variable energy pricing.

14. The method of claim 9, wherein the one or more charging options includes a first option to charge with all most no regard to the cost of charging the EV, a second option to charge that targets managing demand charge costs.

15. A non-transitory computer program product comprising a computer readable storage medium embodying computer program instructions which when executed by a cloud server in a demand response environment cause the cloud server to perform:
    automatically determining a charging routine for an electric vehicle (EV) based on historic rate and charge data of the EV, the cloud server coupled to an electric vehicle supply equipment (EVSE) charging station optionally via a charge management network;
    enabling a user to interactively modify the charging routine in real-time; and
    providing one or more charging options to the user based on a desired trade-off between different charging cost structures via the charging routine,
    wherein the one or more charging options includes an option to charge that targets arbitraging charging activity and managing demand charge costs, and
    wherein the option to charge includes a first routine that both limits power of charging and delays charging, a second routine that prioritizes between limiting power of charging and delaying charging and a third routine that does not limit power of charging and does not delay charging.

16. The non-transitory computer program product of claim 15, wherein the different charging cost structures are based on a rate of charge, a cost of the rate of charge and a variable energy pricing.

17. The non-transitory computer program product of claim 15, wherein the one or more charging options includes a first option to charge with all most no regard to the cost of charging the EV, a second option to charge that targets managing demand charge costs.

* * * * *